UNITED STATES PATENT OFFICE.

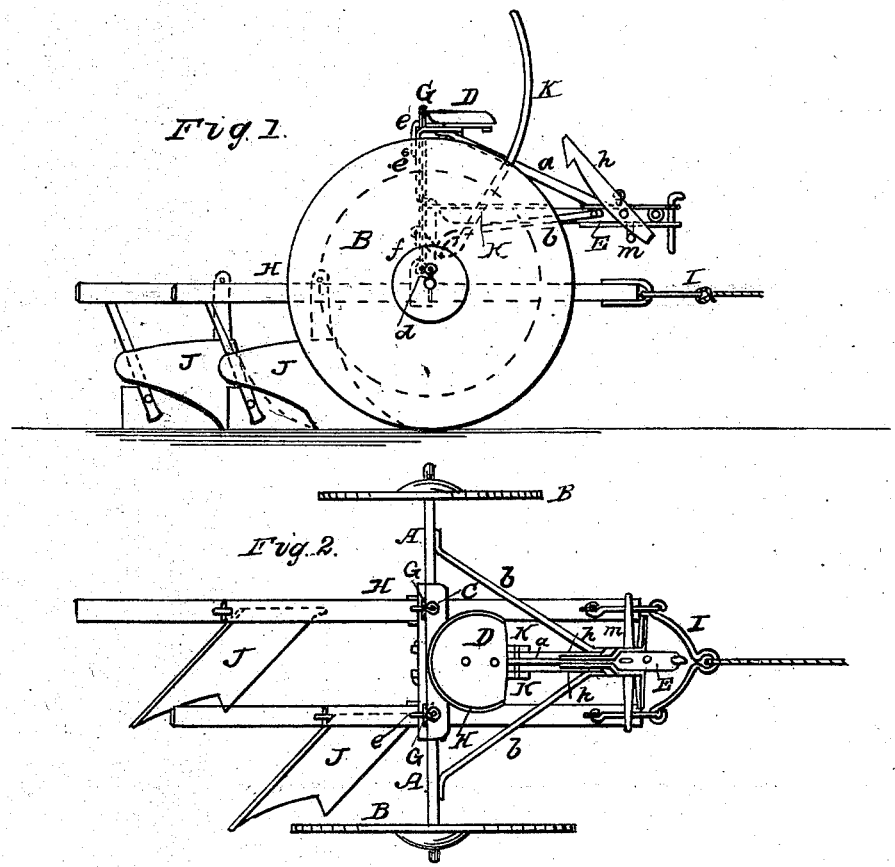

JAMES L. VAN GORDER, OF SIDNEY, OHIO.

IMPROVEMENT IN SULKY-PLOWS.

Specification forming part of Letters Patent No. 106,003, dated August 2, 1870.

*To all whom it may concern:*

Be it known that I, JAMES L. VAN GORDER, of Sidney, in the county of Shelby and State of Ohio, have invented certain new and useful Improvements in Sulky-Plows; and I do hereby declare that the following is a full, clear, and exact description thereof, reference being had to the accompanying drawings, and to the letters of reference marked thereon, which form a part of this specification.

The nature of my invention consists in the construction and arrangement of a sulky-plow, as will be hereinafter fully set forth.

In order to enable others skilled in the art to which my invention appertains to make and use the same, I will now proceed to describe its construction and operation, referring to the annexed drawings, in which—

Figure 1 is a side elevation, and Fig. 2 a plan view, of my plow.

A represents the axle, on the ends of which the wheels B B are placed. The axle is bent in the following manner: The central portion is straight for a suitable distance, and the ends are bent downward and outward to the desired height, and the extreme ends bent horizontally outward to pass through the hubs of the wheels. The wheels are of unequal diameter, the one on the land-side of the plow being smaller than the one on the mold-board side, thus enabling the operator to plow on the side of a hill and bring the land-side close up. The wheels may, of course, be exchanged when necessary.

From the central portion of the axle A rises a frame, C, which supports the driver's seat D, said seat being further supported by a brace, $a$, extending forward to a tongue, E, which is firmly secured in the center of the axle A and at right angles with the frame C. The tongue E is, by means of side rods $b\ b$, braced to the turned-down portions of the axle A. Through the frame C pass two vertical sliding bars, G G, each one of which is, at its lower end, hinged in a loop, $d$, through which the plow-beam H passes and is firmly secured.

At the rear ends of the beams H H the plows J J are attached, while the front ends of said beams are connected by a bail, I, to which the horse or team is attached. The sliding bars G G are prevented from going farther down than desired by means of pins or hooks $e\ e$ passing through their upper ends and catching on the upper edge of the frame C. These pins or hooks may be changed so as to adjust or regulate the plows to work at any depth required.

The bolt which hinges the bar G in the loop $d$ forms, at its inner end, a crank, $f$, which is inserted in the rear end of a lever, K, pivoted on the side of the tongue E, for the purpose of raising the plows out of the ground. By bearing down upon the front end of the lever K the plow-beam, to which it is thus connected, is raised up, the bar G sliding upward in the frame C, and the lever is held in this position by means of a hook, $h$, catching on a pin, $i$, on the side of the lever, said hook being pivoted on the side of the tongue E, as shown. By releasing the hook $h$ from the pin $i$ the plow drops down again into the ground.

On the under side of the tongue E, near the front end, is a cross-bar, $m$, which rests upon the front ends of the beams H H when the plow is in motion.

Having thus fully described my invention, what I claim as new, and desire to secure by Letters Patent, is—

1. The combination of lever K, loop $d$, hook $e$, catch $h$, and sliding bar G, substantially as and for the purpose described.

2. The axle A, wheels B B, frame C, sliding bars G G, plow-beams H H, loops $d\ d$, cranks $f\ f$, levers K K, and hooks $h\ h$, all constructed and arranged to operate substantially as and for the purposes herein set forth.

In testimony that I claim the foregoing as my own I affix my signature in presence of two witnesses.

JAMES L. VAN GORDER.

Witnesses:
M. C. HALE,
G. D. LECKEY.